(12) United States Patent
Alexander et al.

(10) Patent No.: US 9,197,597 B2
(45) Date of Patent: Nov. 24, 2015

(54) RDF OBJECT TYPE AND REIFICATION IN THE DATABASE

(75) Inventors: Nicole Alexander, Nashua, NH (US); Siva Ravada, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 981 days.

(21) Appl. No.: 11/770,978

(22) Filed: Jun. 29, 2007

(65) Prior Publication Data

US 2008/0126397 A1  May 29, 2008

Related U.S. Application Data

(60) Provisional application No. 60/806,492, filed on Jul. 3, 2006.

(51) Int. Cl.
  *G06F 17/30* (2006.01)
  *G06F 7/00* (2006.01)
  *H04L 29/12* (2006.01)

(52) U.S. Cl.
  CPC .......... *H04L 61/30* (2013.01); *G06F 17/30595* (2013.01); *G06F 17/30607* (2013.01); *H04L 29/12594* (2013.01)

(58) Field of Classification Search
  USPC ........................................ 707/802, 803, 809
  See application file for complete search history.

(56) References Cited

U.S. PATENT DOCUMENTS

| | | | |
|---|---|---|---|
| 7,454,428 B2 * | 11/2008 | Wang et al. ............................ 1/1 |
| 2003/0158841 A1 * | 8/2003 | Britton et al. ...................... 707/3 |
| 2003/0208499 A1 * | 11/2003 | Bigwood et al. ............... 707/100 |
| 2004/0210552 A1 * | 10/2004 | Friedman et al. .................. 707/1 |
| 2005/0097108 A1 * | 5/2005 | Wang et al. .................... 707/100 |
| 2005/0204141 A1 * | 9/2005 | Sayers et al. ................... 713/181 |
| 2007/0185930 A1 * | 8/2007 | Betz et al. ...................... 707/203 |
| 2008/0289134 A1 * | 11/2008 | Boussicot et al. .......... 15/250.32 |

OTHER PUBLICATIONS

Nicole Alexander and Siva Ravada, RDF Object Type and Reification in Oracle, published 2005.*
Printout of Citation to—Alexander and Ravada, "RDF Object Type and Reification in Oracle", Technical White paper Published 2005.*
Momtchev and Kiryakov, ORDI: Ontology Representation and Data Integration Framework, Publsihed Oct. 2006.*

* cited by examiner

*Primary Examiner* — Jeffrey A Burke
(74) *Attorney, Agent, or Firm* — Vista IP Law Group, LLP

(57) ABSTRACT

A method for representing RDF data in a database provides a new RDF data type built on top of a network data model (NDM), where a network or graph captures relationships between objects using connectivity. This exposes the NDM functionality to RDF data, allowing RDF data to be managed as objects and analyzed as networks. In this network, the subject and objects of triples are mapped to nodes, and the predicates are mapped to links that have subject start-nodes and object end-nodes. A link, therefore, represents a complete RDF triple. The nodes are stored only once, regardless of the number of times they participate in triples. But a new link is created whenever a new triple is inserted. A streamlined approach to representing reified RDF data is also provided for faster retrievals. An RDF object type and reification in the database thus provide a basic infrastructure for effective metadata management.

17 Claims, 5 Drawing Sheets

RDF OBJECT TYPE AND REIFICATION IN THE DATABASE

CROSS-REFERENCE TO RELATED APPLICATIONS

This application claims priority to U.S. provisional application, entitled "RDF Object Type and Reification in the Database", Ser. No. 60/806,492, filed on Jul. 3, 2006.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The invention relates to the Resource Description Framework (RDF) data model, and particularly to representing RDF data in a database.

2. Description of Related Art

Resource Description Framework (RDF) is a standard for representing information about resources in the World Wide Web; in particular, it is intended for representing metadata about Web resources. These resources include Web pages and things that can be identified using a Uniform Resource Identifier (URI). A URI is a more general form of the Uniform Resource Location (URL). It allows information about a resource to be recorded without the use of a specific network address. RDF is a data model for the description of resources, which includes statements about resources. In RDF, a resource is any identifiable thing. A statement about a resource is represented using a triple, which includes a subject, predicate or property, and an object. The subject is an ID for the resource, which is being described by the statement. The object is either a Unicode character string or an ID of another resource. The predicate or property is an ID for the relationship between the subject and the object. The IDs in the subject and predicate, and in the object if it is a resource, are formatted as URIs. This triple is effectively modeled as a directed graph. As illustrated in FIG 1, the subject and object of the triple are modeled as nodes, and the predicate as a directed link that describes the relationship between the nodes. The direction of the link points toward the object.

A number of RDF storage systems and browsers are available. Many of the available systems implement persistent storage using relational databases, where data is stored in flat relational tables. In these systems, triples are stored in a main statement table with links to supporting tables. The main statement table has columns for the subject, predicate, and object, and each row in the table represents a triple.

There are disadvantages to using this method of storage: In applications development, mapping is required between the client-side RDF objects, and database columns and tables that contain the triples. A user is required to be aware of the structure for the RDF data storage in order to perform the mapping. The process of applications development therefore has limited ease and is often inefficient. There is thus a need for an alternative approach to managing RDF data that will make it easier to model RDF applications and allow applications to be developed more efficiently.

BRIEF SUMMARY OF THE INVENTION

A method for representing RDF data in a database provides a new RDF data type built on top of a network data model (NDM), where a network or graph captures relationships between objects using connectivity. This exposes the NDM functionality to RDF data, allowing RDF data to be managed as objects and analyzed as networks. In this network, the subject and objects of triples are mapped to network nodes, and the predicates are mapped to network links that have subject start-nodes and object end-nodes. A link, therefore, represents a complete RDF triple. The nodes are stored only once, regardless of the number of times they participate in triples. But a new link is created whenever a new triple is inserted. A streamlined approach to representing reified RDF data is also provided for faster retrievals. An RDF object type and reification in the database thus provide a basic infrastructure for effective metadata management.

Other objects and advantages will be apparent to those skilled in the arts to which the invention pertains upon perusal of the following Detailed Description and drawing, wherein:

Figure 1:
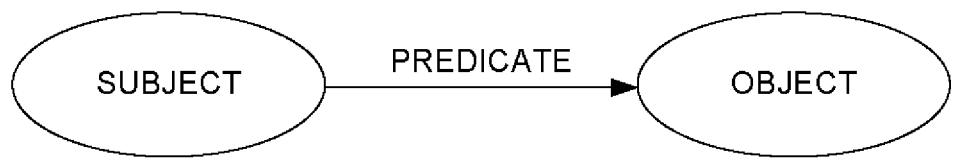
FIG. 1 illustrates an RDF triple in a directed graph data model.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The invention provides an improved method for representing RDF data in a database. The following description is presented to enable one of ordinary skill in the art to make and use the invention and is provided in the context of a patent application and its requirements. Various modifications to the described embodiments will be readily apparent to those skilled in the art and the generic principles herein may be applied to other embodiments. Thus, the invention is not intended to be limited to the embodiment shown but is to be accorded the widest scope consistent with the principles and features described herein.

Using NDM to Represent RDF Objects

A new RDF data type is built on top of a network data model (NDM), in which a network or graph captures relationships between objects using connectivity. This exposes NDM functionality to RDF data, allowing RDF data to be managed as network objects and analyzed as networks. In this network, the subjects and objects of triples are mapped to network nodes, and the predicates are mapped to network links that have subject start-nodes and object end-nodes. A link, therefore, represents a complete RDF triple. The nodes are stored only once, regardless of the number of times they participate in triples. A new link is created whenever a new triple is inserted.

Figure 2:
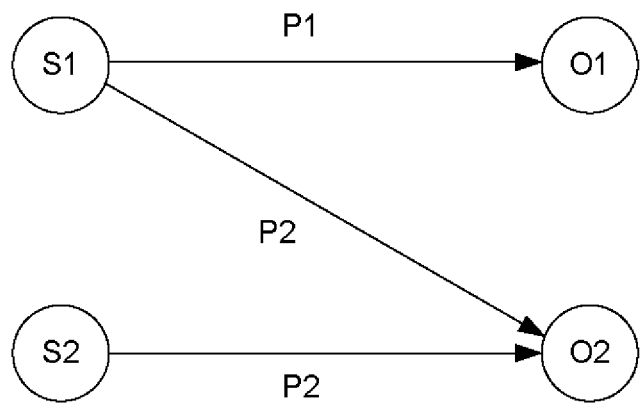
FIG. 2 illustrates an RDF graph of three RDF triples as modeled in the database.

FIG. 2 illustrates how an RDF graph of three RDF triples: <S1, P1, O1>; <S1, P2, O2>; <S2, P2, O2> is modeled. When a triple is deleted from the database, the corresponding link is removed. However, the nodes attached to this link are not removed.

There are many advantages to managing RDF data as a database object: RDF applications are easier to model; RDF data can be easily integrated with other enterprise data; reusability of the RDF object makes it possible to develop applications more efficiently; object abstraction and the encapsulation of RDF-specific behaviors make applications easier to understand and maintain; no mapping is required between client-side RDF objects, and database columns and tables that contain triples; and no additional configurations are required for storing RDF data.

RDF triples are parsed and stored in global tables under a central schema. All the triples for all the RDF graphs (or models) in the database are stored under this schema. Only references (IDs) to these triples are stored in user-defined application tables. The application tables may contain other attributes related to the triples. Functions are provided to retrieve the actual triples when necessary and user-level access functions and procedures are provided for query, inference, and update.

There are two key tables used in RDF data storage: a Values table and a Links table.

The Values table stores the text values for triples. Each text entry is uniquely stored. The columns of this table include a Value ID and a Value Name.

The Value ID is the unique identifier for a text value. It is generated by the system each time a row is inserted.

The Value Name is the actual text value for a part of the triple. Each text value is stored only once in the Values table, but may be referenced multiple times in the Links table.

Other columns for other attributes related to the text values are possible in the Values table, including: Value Type, Literal Type, Language Type, and Long Value.

The Value Type column stores the type of text value stored in the Value Name column. URI, blank node, plain literal, plain literal with a language tag, plain long-literal, and typed long-literal are some of the supported types. A blank node is used when a subject or object node is unknown. A literal is a string with an optional language tag. It is used to represent values like names, dates, and numbers. The language tag specifies the language of the literal. A typed literal is a string combined with a datatype. The datatype is always a URI. Long-literals are text values that exceed 4000 characters.

The Literal Type column stores the datatype URI for a typed literal or typed long-literal.

The Language Type column stores the language tag for a plain literal or plain long-literal, with a language specified.

The Long Value column stores the plain long-literal or typed long-literal text value.

The Links table stores the triples for all the RDF graphs in the database. The columns of this table include a Link ID, a Start Node ID, a P Value ID, and an End Node ID.

The Link ID is the unique triple identifier. It is generated by the system each time a row is inserted.

The Start Node ID is the Value ID for the text value of the subject of the triple.

The P Value ID is the Value ID for the text value of the predicate of the triple.

The End Node ID is the Value ID for the text value of the object of the triple.

Other columns for other attributes related to the triple are possible, including: Canon End Node ID, Link Type, Cost, Context, Reif Link, and Model ID.

The Canon End Node ID column stores the Value ID for the text value of the canonical form of the object of the triple.

The Link Type column stores the type of predicate represented by the URI of the P Value ID.

The Cost column stores the number of times a triple is stored in an application table. The triple is only stored once in the Links table, but may exist in several rows in a user's application table. Each time a row referencing the Link ID is inserted into the application table, the Cost column for that Link ID in the Links table is incremented by one. Whenever a row referencing the Link ID is removed from the application table, the Cost column for that Link ID is decremented by one. The Link ID's record is completely removed from the Links table when the Cost column is zero, indicating that there are no other rows in the application table referencing that Link ID.

The Context column stores whether a triple was directly entered into the database or inferred as part of a reification statement. A reification of a statement in RDF is a description of the statement using an RDF statement. The storage of a reified statement is described later in this document.

The Reif Link column stores whether the Start Node ID, P Value ID, or End Node ID references a reified triple.

The Model ID column stores the ID for the RDF graph to which the triple belongs. It logically partitions the table by RDF graphs.

Figure 3:
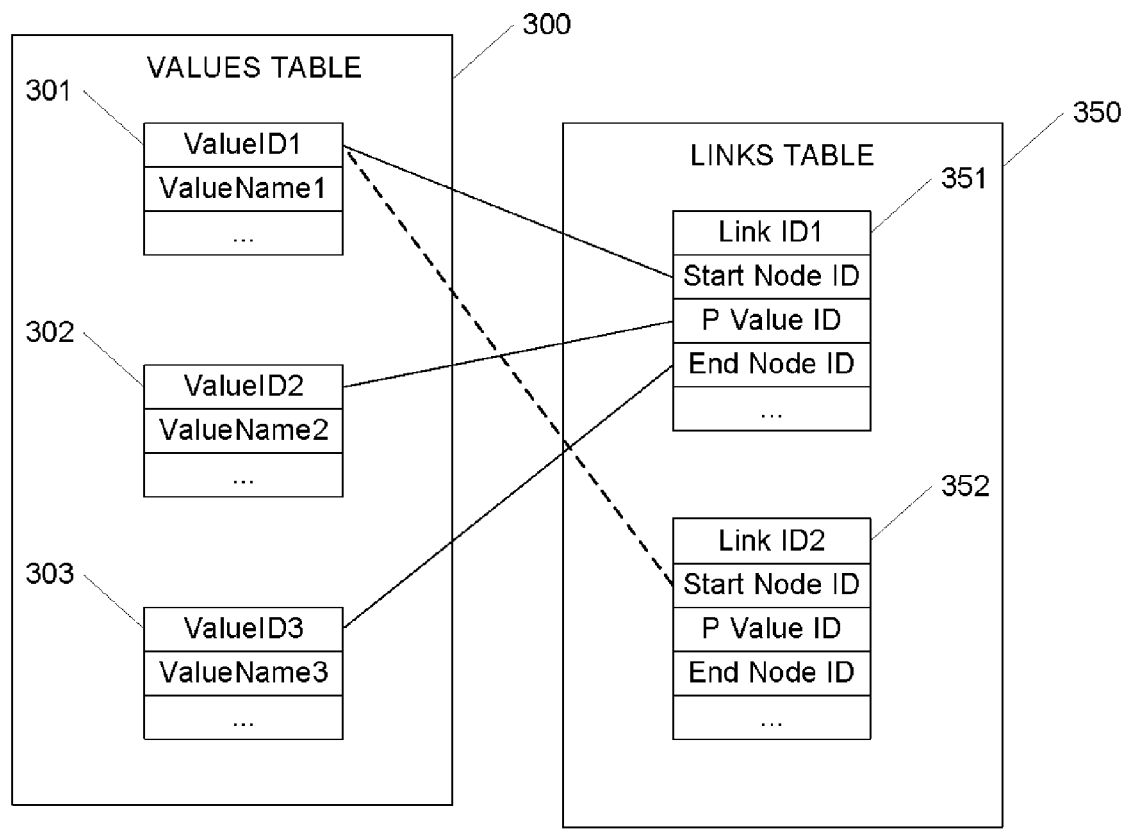
FIG. 3 illustrates a Values table and a Links table and their connections.

FIG. 3 illustrates the Values and Links tables and their connections. The Values table 300 stores three records 301, 302, 303 for the different text values. For example, the text value ValueName1 is associated with the unique ID ValueID 1. The text value ValueName2 is associated with the unique ID of ValueID2. The text value ValueName3 is associated with the unique ID of ValueID3. A record 351 exists in the Links table 350 for a triple associated with a unique Link ID. In this record 351, the Start Node ID is ValueID1, the P Value ID is ValueID2, and the End Node ID is Value ID3. A complete triple is thus obtainable through its Link ID (LinkID1), as the text values of the subject, predicate, and object of the triple can be accessed through the Start Node ID, P Value ID, and End Node ID associated with the Link ID. If a second record 352 in the Links table has the same subject text value of ValueName1, then ValueID1 would be stored as the Start Node ID and associated with the Link ID (LinkID2) of the second record 352. In this manner, two triples can reference the same text value without redundantly storing the text value.

Figure 4:
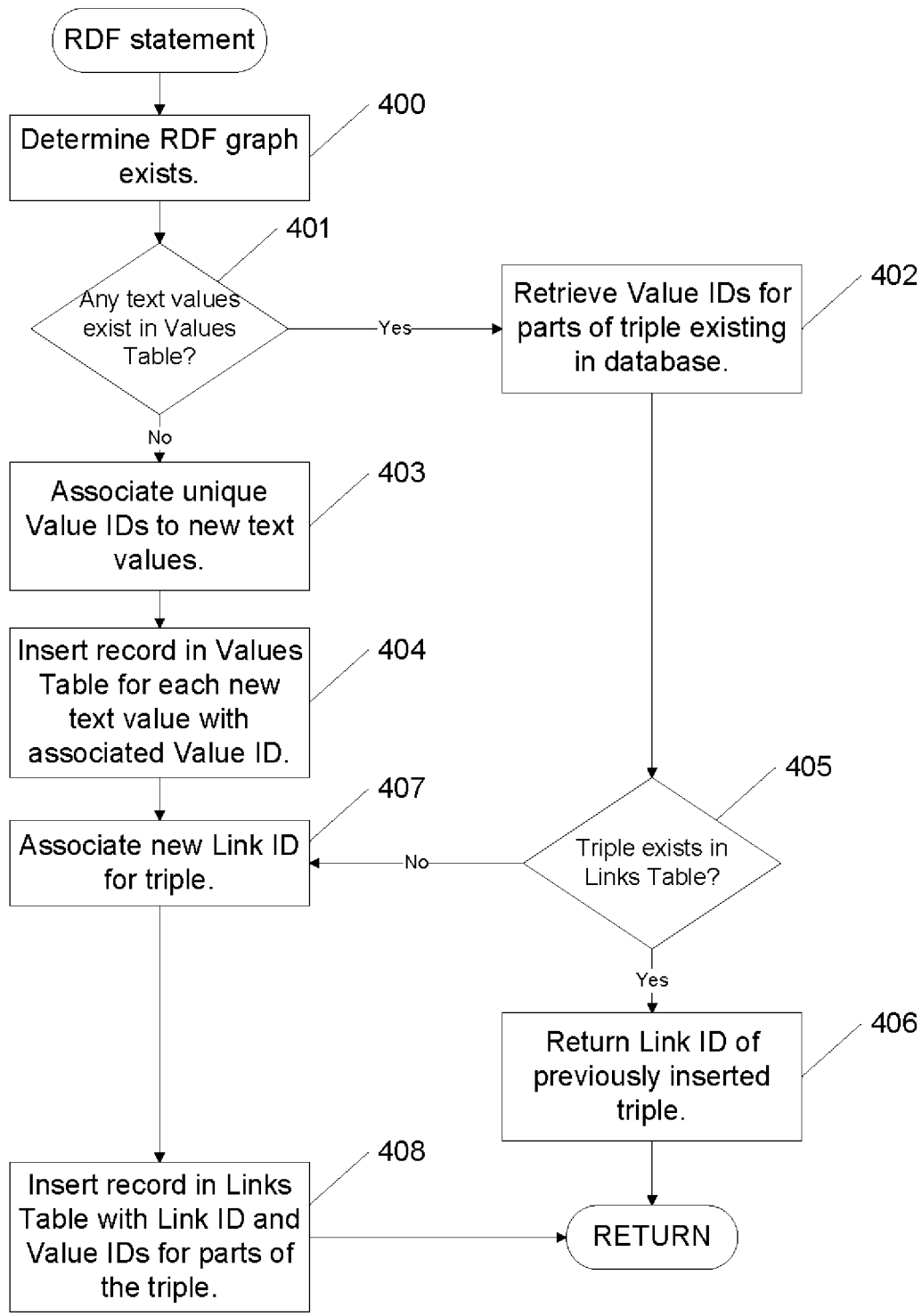
FIG. 4 is a flowchart illustrating the parsing of a triple for storage in a database.

FIG. 4 is a flowchart illustrating the parsing of a triple for storage in a database. When a new statement is inserted into the RDF graph, a check is first made to ensure that the RDF graph exists (step 400). The Values table is then checked to determine if the text value for each part of the triple (subject, predicate, object) already exist in the database (step 401). If they already exist, their Value IDs are retrieved (step 402). If not, then each new text value is assigned a unique Value ID (step 403). A record is inserted in the Values table for each new text value with its associated Value ID (step 404).

If no new text records are inserted into the Values table, the Links table is then checked to determine if the triple already exists (step 405). If the triple already exists, the Link ID for the previously inserted triple is returned to the application table (step 406), and no new record is inserted to the Links table. If the triple does not exist in the Links table, then a new unique Link ID is generated and associated with the triple (step 407). A record is inserted into the Links table with the Link ID and the Value IDs for the parts (predicate, subject, and object) of the triple (step 408). The Value ID for the predicate of the triple becomes the P Value ID in the Links table, and the Value IDs for the subject and object of the triple become the Start Node ID and the End Node ID, respectively. A new record is inserted into the Links table whenever a new triple is entered into the RDF graph.

Each triple is stored only once in the Links table, but may be referenced multiple times through its Link ID. Each text value is stored only once in the Values table, but may be referenced multiple times through its Value ID. By storing the triples in the Links table and storing the text values of the triples in a separate Values table, significant storage savings over flat relational tables can be realized.

Inserted triples may contain blank nodes as their subject nodes and object nodes, representing unknown subjects and unknown objects, respectively. When encountered, blank nodes are automatically renamed to globally unique, system-generated blank nodes of the form _:ORABNuniqueID. Unlike other text values, blank nodes are not automatically reused by the system. However, a user has the option to specify whether a particular blank node is to be reused by incoming triples. In such a case, the blank node's original name, along with the system-generated Value Name and Value ID are stored in a Blank Nodes table. Future incoming blank nodes with the same original name and belonging to the specified RDF graph will cause the existing blank node's Value ID in the database to be reused.

The Blank Node table has columns Node ID, Node Value, Orig Name, and Model ID:

The Node ID column stores the Value ID for the blank node.

The Node Value column stores the Value Name, derived by appending a globally unique, system-generated identifier for the node to the blank-node prefix _:ORABN. This forms a Value Name of _:ORABNglobal_id, for example, _:ORABNECCC47BB78B5F82AE030578CD30550CC.

The Orig Name column stores the original name of the blank node, as entered by the user.

The Model ID column stores the ID for the RDF graph from which a blank node can be reused.

To reuse blank nodes, a blank node constructor is used to input an RDF triple. When the blank node constructor is used, on input, the Blank Nodes table is first searched (instead of the Values table) for a blank node with the same Model ID, and either the same Orig Name or the same Node Value as the blank node being entered. If found, the Node ID (or Value ID) is used to construct the incoming triple; if none is found, a new blank node entry is made to the Values table, and the Value ID (Node ID), Value Name (Node Value), Orig Name, and Model ID inserted into the Blank Nodes table to be subsequently reused by incoming blank nodes. Strictly speaking, it is not necessary to store the Node ID in the Blank Nodes table since the Node Value is also unique, however, it is stored for performance reasons. Deleting blank nodes from the Blank Nodes table will not remove the corresponding text from the Values table. However, it will prevent these blank nodes from being reused when the blank node constructor is utilized in the future.

Reification

In some applications, there is the need to provide metadata for the RDF triples. This is called reification. A reification of a statement in RDF is a description of the statement using an RDF statement. A triple <S, P, O> is first stored for the base statement. Assertions can then be made about the base statement as a reification of its triple <S, P, O>.

Conventionally, a reified statement is stored using four triples, called a reification quad. For example, the triple <S, P, O> reified by a resource R is represented by the four triples:

<R, rdf:type, rdf:Statement>
<R, rdf:subject, S>
<R, rdf:predicate, P>
<R, rdf:object, O>

Figure 5A:
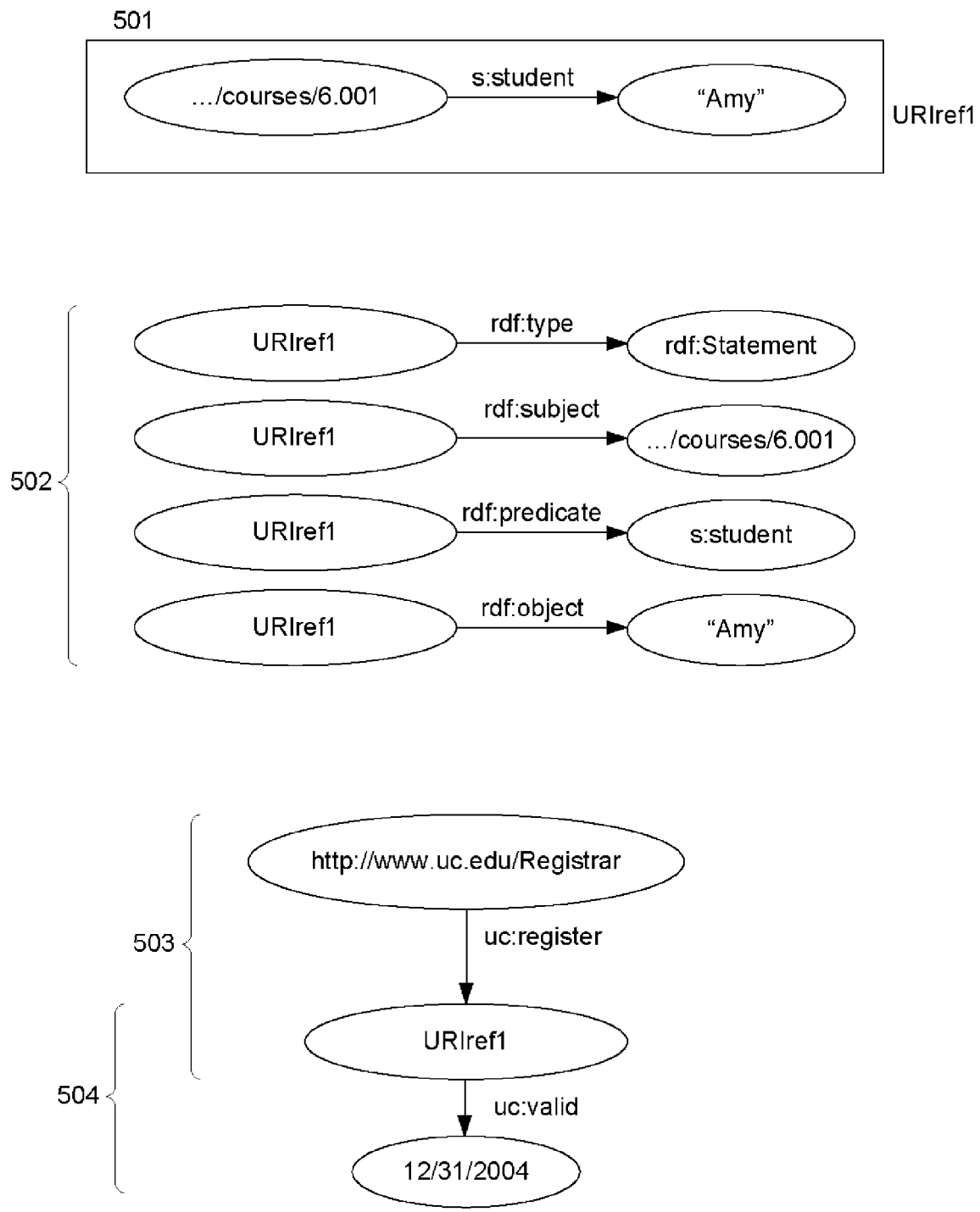
FIGS. 5A and 5B illustrate an example of reification of an RDF statement.

FIG. 5A illustrates an example of a conventional reification of an RDF statement and two assertions. Here, the base statement is "Course 6.001 has a student Amy", which is represented by the triple 501. This triple is stored for the base statement. Before assertions can be made about this statement, a URI (URIref1) is assigned to represent the base statement's reifying resource and four new triples (the reification quad) created in 502:

<URIref1, rdf:type, rdf:Statement>
<URIref1, rdf:subject, . . . /courses/6.001>
<URIref1, rdf:predicate, s:student>
<URIref1, rdf:object, Amy>

Storage of the reification quad thus requires significant overhead, since four new triples are created for each reification. Two example assertions for the reified triple 501, are shown in 503 and 504. The first assertion is "the registrar says Course 6.001 has Amy as a student", which is represented by the triple 503. Here "Course 6.001 has Amy as a student" is represented by URIRef1. The second assertion is "Course 6.001 has Amy as a valid student as of Dec. 31, 2004", which is represented by the triple 504. Reification therefore allows triples to be attached as properties to other triples.

With the invention, to represent a reified statement, a reifying resource is generated using the unique Link ID of the base statement's triple. The resource generated is an XML database URI (DBUri[Link ID]), which points directly to the base statement's Link ID record in the database. An XML database URI (DBUri) is a URI that points directly to a single row, a set of rows, or a single column in a database. Functions and procedures can be called to retrieve the data to which a DBUri points. The DBUri resource generated for the base statement can then be used as the subject or object of an assertion. To reify a statement, a reification constructor is called which generates a single triple:

<DBUri[Link ID], rdf:type, rdf:Statement>

This triple is stored in the database in the same manner as other triples, as set forth above, except the Reif Link attribute in the Links table is set to 'Y' for that triple. Because the DBUri[Link ID] for the reified statement is a direct link to the base statement's triple and can be used to retrieve the triple, only one triple is stored for the reified statement, rather than the four triples stored for the reification quad.

A triple can then be entered for each assertion about the reified statement, using the DBUri[Link ID] as the subject or object of the assertion. Each reified statement's DBUri[Link ID] resource will only be stored once in the RDF model, regardless of the number of assertions made using this resource. To make an assertion, an assertion constructer is called, which calls the reification constructor (if the triple was not previously reified) and makes an assertion statement about the triple identified by the DBUri[Link ID]. If the assertion is about a statement not already existing in the database, then the assertion is for an implied statement. In such a case, a base triple is first inserted into the database for the implied statement, and then the reification constructor is called before making the assertion.

Figure 5B:
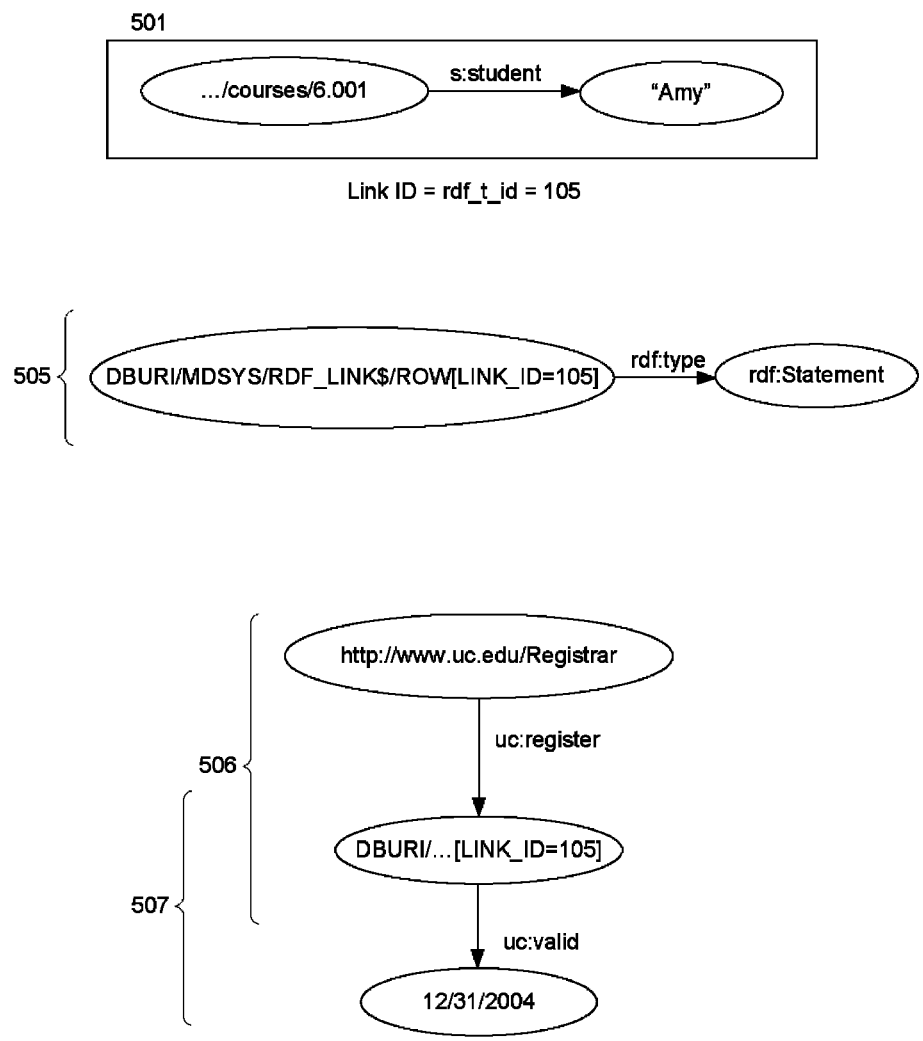

FIG. 5B illustrates an example of the reification of an RDF statement according to the invention. In this example, the base statement is "Course 6.001 has a student Amy". This triple 501 for the base statement is stored in the Values table and Links table as described above. If the base statement previously existed in the database before it was reified, it is regarded as a direct statement, and its Context attribute in the Links table is set to "D" for "direct". If a base statement is entered into the database only as part of a reification statement, it is regarded as an implied statement, and its Context attribute is set to "I" for "indirect".

Assume that the base statement's triple was assigned Link ID=rdf_t_id:105. To process a reification of this statement, a triple 505 is first entered with the reified statement's DBUri [Link ID] resource as subject, rdf:type as the predicate, and rdf: Statement as object. Here, a DBUri, DBURI/MDSYS/RDF_LINK$/ROW[LINK_ID=105] generated from the Link ID of the base statement's triple is stored as the subject. Each reified statement's resource will have only one rdf: type→rdf:Statement associated with it, regardless of the number of assertions made using this resource.

In this example, two assertions are made. One triple 506 is entered for the first assertion, with http://www.uc.edu/Registrar as the subject, uc:register as the predicate, and the reified statement's DBUri[Link ID] as the object, e.g.:
<http://www.uc.edu/Registrar, uc:register, DBURI/MSYS/RDF_LINK $/ROW[LINK_ID=105]>.
A second triple 507 is entered for the second assertion, with the reified statement's DBUri[Link ID] as the subject, uc:valid as the predicate, and Dec. 31, 2004 as the object e.g.:
<DBURI/MDSYS/RDF_LINK$/ROW[LINK_ID=105], uc:valid, 12/31/2004>.

Analysis of RDF Data

If network analysis of the RDF data is desired, a Nodes table is used to store the nodes (start nodes and end nodes) for the RDF graph. The Nodes table is derived from the information stored in the Values table and the Links table. The Nodes table includes a Node ID column and an Active column:

The Node ID column stores a unique ID and is the same as the Value ID in the Values table. The RDF Nodes table stores only the Value IDs that belong to nodes (i.e., subjects and objects) of statements in the database.

The Active attribute in the Active column is set to 'Y' if a node is to be used in analysis, and 'N' otherwise.

Network applications are not able to directly use the Values table because it additionally stores link (predicate) names. The Nodes table provides the information from the Values table needed by a network application. Users can then add other information to the Nodes table that is needed for analysis and display. An example of an RDF application using network analysis is a Social Network application. A Social Network is a social structure made of nodes (which are generally individuals or organizations) that are tied by one or more specific types of relations (links), such as friends, kinship, disease transmission, etc. It allows individuals to be tracked. In analyzing social networks the "Shortest Path Analysis" in the NDM can be used to determine the shortest connection between two individuals.

Functions can therefore be called on the Nodes and Links tables to analyze the RDF data as a network. Functions can also be called on the RDF object type. For example, a member function can be used to obtain the subject, predicate, and object of a triple as a complete statement. Other member functions can be used to obtain the subject, predicate, and object separately.

Conclusion

A method for representing RDF data in a database has been disclosed. The method provides a new RDF data type built on top of a network data model (NDM), in which a network or graph captures relationships between objects using connectivity. This exposes the NDM functionality to RDF data, allowing RDF data to be managed as objects and analyzed as networks. In this network, the subject and objects of triples are mapped to nodes, and the predicates are mapped to links that have subject start-nodes and object end-nodes. A link, therefore, represents a complete RDF triple. The nodes are stored only once, regardless of the number of times they participate in triples. But a new link is created whenever a new triple is inserted. A streamlined approach to representing reified RDF data is also provided for faster retrievals. An RDF object type and reification in the database thus provide a basic infrastructure for effective metadata management.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Specifically, although the invention is described above in the context of NDM, one of ordinary skill in the art will understand that the invention may be used in other contexts without departing from the spirit and scope of the invention.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A method of storing and performing reification of a first RDF triple in a database system which includes a network data model wherein items of data in the database system are represented as a network made up of nodes and directed links, a directed link having a start node and an end node and the method comprising the steps of:

associating the first RDF triple's subject with a subject/object node in a node table of the network data model;

associating the first RDF triple's object with a subject/object node in the node table;

associating the first RDF triple's predicate with an RDF triple link in a link table of the network data model, the RDF triple link representing the first RDF triple and having a start node being a link to the subject/object node associated with the first RDF triple's subject and an end node being a link to the subject/object node associated with the first RDF triple's object;

generating a resource representing the first RDF triple and pointing to the RDF triple link, without generating additional RDF triples in the link table linking the generated resource with the subject, object, or predicate of the first RDF triple if the RDF triples link already exists; and using the generated resource as a subject or an object of a second RDF triple.

2. The method of storing an RDF triple set forth in claim 1 wherein:

if there is already a subject/object node in the node table for the subject and/or object of the RDF triple being stored, the step of associating subject and/or object of the RDF triple with the subject/object node is not performed and in the RDF triple link that is associated with the RDF triple's predicate, the RDF triple link's start node is the subject/object node for the subject that is already in the node table and/or the RDF triple link's end node is the subject/object node for the object that is already in the node table.

3. The method of storing an RDF triple set forth in claim 1 wherein:
if there is already a RDF triple link in the link table that represents the RDF triple to be stored, the RDF triple is not stored.

4. The method of storing an RDF triple set forth in claim 1 wherein:
the database system includes a values table wherein are stored values specifying subjects, objects, and predicates, a subject-object node specifying a value in the values table for the subject or object represented by the subject/object node and a RDF triple link specifying a value in the values table for the predicate represented by the RDF triple link.

5. The method of storing an RDF triple set forth in claim 4 further comprising the step of:
if the value for the subject, object, or predicate of the RDF triple being stored is not already in the values table, storing the value in the values table.

6. The method of storing an RDF triple set forth in claim 4 wherein the database further comprises:
a blank nodes table of the network data model, the nodes in the blank nodes table representing unknown subjects or unknown objects of triples and a blank nodes table node specifying a value in the values table that uniquely identifies the unknown subject or unknown object; and
when a subject and/or an object of the RDF triple being stored is unknown, the unknown subject and/or object is associated with a blank nodes table node.

7. The method of storing an RDF triple set forth in claim 1 wherein:
associating the generated resource with a subject/object node.

8. A data storage device which is characterized in that:
the data storage device contains code which, when executed by a processor that has access to the data storage device, performs the method of claim 1.

9. A database for storing and performing reification of RDF triples in a database system, the database system including a network data model wherein items of data in the database system are represented as a network made up of nodes and directed links, a directed link having a start node and an end node, and the database comprising:
a node table of the network data model wherein are stored subject/object nodes that represent subjects and objects of the RDF triples; and
a link table of the network data model wherein are stored RDF triple links that represent RDF triples, each RDF triple link further representing an RDF triple's predicate and specifying a link to the subject/object node in the node table that represents the represented RDF triple's subject as a start node and a link to the subject/object node in the node table that represents the represented RDF triple's object as an end node;
wherein the node table contains at least one subject/object node associated with a resource that represents a link to a first RDF triple and points to an RDF triple link corresponding to the first RDF triple, wherein the resource is not linked through additional RDF triples in the link table to the subject, object, or predicate of the first RDF triple; and
wherein the resource is used as a subject or an object of a second RDF triple if the RDF triple's link already exists; and
wherein the resource is used as a subject or an object of a second RDF triple.

10. The database of claim 9, wherein:
a given RDF triple of the RDF triples is represented in the link table by only one RDF triple link.

11. The database of claim 10, wherein:
a given RDF triple link can be referenced multiple times in an application table.

12. The database of claim 11, wherein:
the RDF triple link further includes a cost value which indicates a number of times the RDF triple link is referenced in the application table.

13. The database of claim 9, wherein:
a given subject or object of the RDF triples is represented in the node table by only one subject/object node.

14. The database of claim 13, wherein:
a given subject/object node can be referenced multiple times in the link table.

15. The database of claim 9, further comprising:
a values table wherein are stored values specifying subjects, objects, and predicates, a subject-object node specifying a value in the values table for the subject or object represented by the subject/object node and a RDF triple link specifying a value in the values table for the predicate represented by the RDF triple link.

16. The database of claim 15, further comprising:
a blank nodes table of the network data model, the nodes in the blank nodes table representing unknown subjects or unknown objects of triples and a blank nodes table node specifying a value in the values table that uniquely identifies the unknown subject or unknown object.

17. A data storage device characterized in that:
the data storage device contains the database set forth in claim 9.

* * * * *